April 11, 1939.  H. M. ULLMAN  2,153,703
GRAIN CONVEYER
Filed Aug. 4, 1937
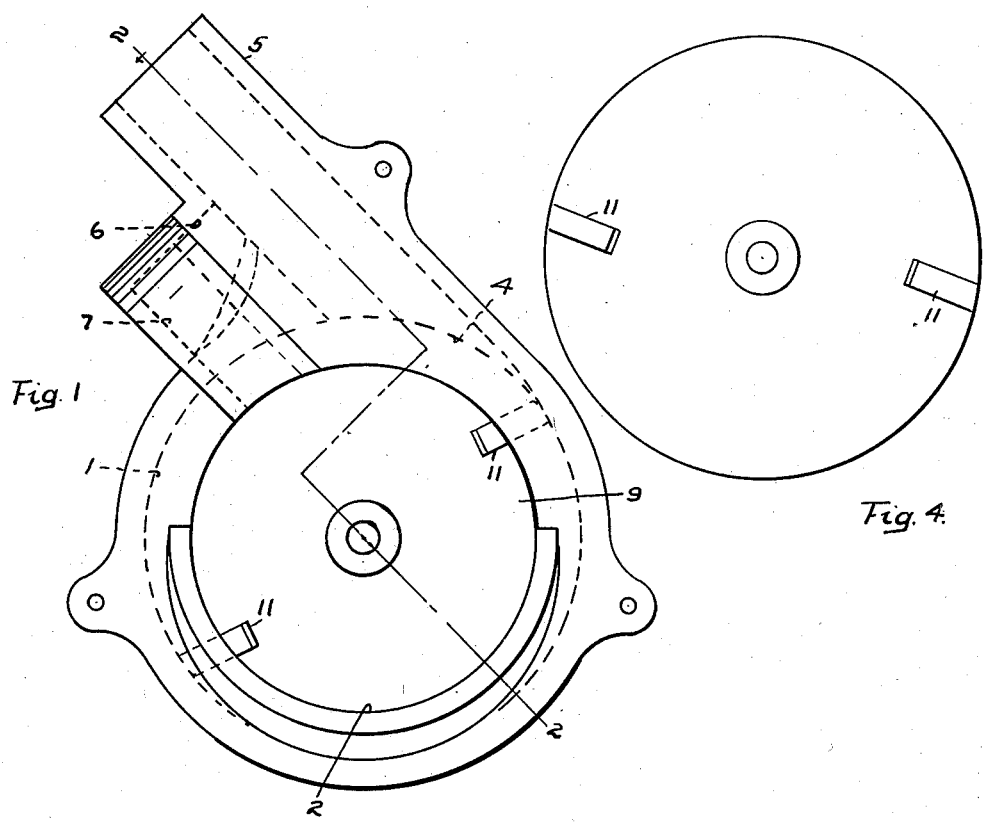
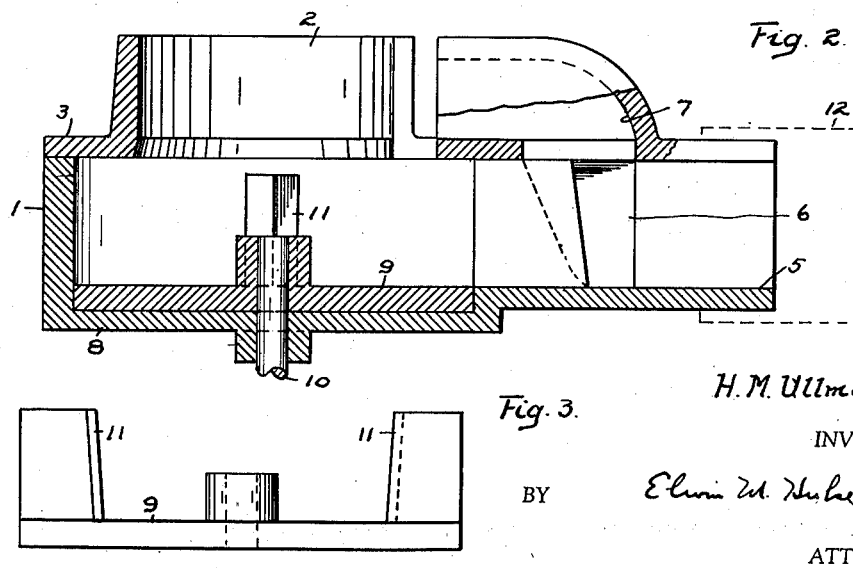
H. M. Ullman
INVENTOR.
BY Elwin M. Huber
ATTORNEY.

Patented Apr. 11, 1939

2,153,703

UNITED STATES PATENT OFFICE 2,153,703

GRAIN CONVEYER

Howard M. Ullman, Bluffton, Ind.

Application August 4, 1937, Serial No. 157,358

3 Claims. (Cl. 198—128)

The invention relates to grain conveyers and it is particularly directed to means for conveying the grain from corn shelling machines.

The object of the invention is to provide a simple, efficient and inexpensive device by which to convey grain from one point to another.

The invention is illustrated in the accompanying drawing, in which

Figure 1 is a front elevation of a device embodying the invention.

Fig. 2 is a cross-section on line 2—2 of Fig. 1.

Fig. 3 is an elevation of the ejector and

Fig. 4 is a plan view of the ejector.

Referring to the illustrative embodiment of the invention, 1 is an annular chamber having a feed opening 2 in one side 3 and a discharge opening 4 in its periphery leading to a conduit 5 that is preferably integral with the walls of the chamber and preferably tangential to the chamber. A chute 6, leading from the bottom of the conduit 5 adjacent to the peripheral wall of the chamber, communicates with a passageway 7 formed on the side wall 3 of the chamber.

The opposite side wall 8 of the chamber is recessed on its inner side to receive an annular disk 9, which is provided with a spindle 10 that projects through a suitable bearing formed on said wall and to which suitable power is applied for rotating the disk. A suitable number of blades 11 projects into the chamber 1 from the face of the disk 9 in planes diagonal to the radius of the disk, and which, when the disk is rotated, travel across the discharge opening 4.

In operation, the disk 9 is rotated at high speed and the grain enters the chamber through the feed opening 2. The rotating blades contact the grains and impel and eject them into and through the conduit 5 and through a conduit 12 connected to the conduit 5 that leads to a bin or other receptacle where it is desired to deliver the grain. The angularity of the blades is such that the blades tend to forcibly impel the grains toward the peripheral wall of the chamber and into the conduit 5. Where the conduit is upwardly inclined, the grains that fail to travel through the conduit to the discharge point roll or slide down on the bottom of the conduit and re-enter the chamber through the by-pass 6, 7, to be again picked up by the rotating blades and ejected into the conduit.

The ejector 9 may have any suitable form, the disk being illustrative only, and it may be mounted for rotation in the chamber in any suitable manner. The number of blades may be varied as conditions may require.

The device is adaptable to various uses, that of conveying shelled corn from a corn sheller being only one such use.

What I claim is:

1. A device of the class described comprising an annular chamber having a feed opening in one side, the opposite side wall having a recess therein, a discharge conduit integral with and communicating with the chamber through the peripheral wall thereof, a disc revolubly mounted in the recess and having a plurality of blades on its exposed face to contact and eject the fed materials through the conduit, and a short by-pass formed on and integral with the conduit, and communicating therewith and opening directly into the chamber adjacent to the entrance into the conduit.

2. A device of the class described, comprising an annular chamber having a feed opening in one side wall, a discharge conduit communicating with the chamber through the peripheral wall thereof, a revolubly mounted carrier within the chamber having a plurality of angularly disposed blades thereon adapted to contact materials fed into the chamber and eject them into and through the conduit, and a by-pass communicating with the bottom of the conduit at a point adjacent the wall of the chamber and opening directly into the chamber adjacent said discharge conduit and adapted to convey back to the chamber the materials that fail to exit from the discharge conduit.

3. A device of the class described comprising an annular chamber having a feed opening in one side, the opposite side wall having a recess therein, a discharge conduit communicating with the chamber through the peripheral wall thereof, a disc revolubly mounted in the recess and having a plurality of blades on its exposed face to contact and eject the fed materials through the conduit, and a by-pass communicating with the conduit and opening directly into the chamber adjacent to the entrance into the conduit.

HOWARD M. ULLMAN.